US012009000B2

(12) United States Patent
Ravelli et al.

(10) Patent No.: US 12,009,000 B2
(45) **Date of Patent: *Jun. 11, 2024**

(54) APPARATUS AND METHOD FOR COMFORT NOISE GENERATION MODE SELECTION

(71) Applicant: Fraunhofer-Gesellschaft zur Foerderung der angewandten Forschung e.V., Munich (DE)

(72) Inventors: Emmanuel Ravelli, Erlangen (DE); Martin Dietz, Nuremberg (DE); Wolfgang Jaegers, Erlangen (DE); Christian Neukam, Kalchreuth (DE); Stefan Reuschl, Nuremberg (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/568,498

(22) Filed: Jan. 4, 2022

(65) Prior Publication Data

US 2022/0208201 A1 Jun. 30, 2022

Related U.S. Application Data

(63) Continuation of application No. 16/141,115, filed on Sep. 25, 2018, now Pat. No. 11,250,864, which is a (Continued)

(30) Foreign Application Priority Data

Jul. 28, 2014 (EP) .................................... 14178782

(51) Int. Cl.

*G10L 19/012* (2013.01)
*G10L 19/02* (2013.01)
(Continued)

(52) U.S. Cl.

CPC ........ *G10L 19/012* (2013.01); *G10L 19/0204* (2013.01); *G10L 19/22* (2013.01); *G10L 21/0232* (2013.01)

(58) Field of Classification Search

CPC ... G10L 19/012; G10L 21/0232; G10L 19/22; G10L 19/0204

See application file for complete search history.

(56) References Cited

U.S. PATENT DOCUMENTS

| | | | |
|---|---|---|---|
| 3,989,897 | A | 11/1976 | Carver |
| 5,903,819 | A | 5/1999 | Romesburg |

(Continued)

FOREIGN PATENT DOCUMENTS

| | | | |
|---|---|---|---|
| CN | 1470052 | A | 1/2004 |
| CN | 101430880 | A | 5/2009 |

(Continued)

OTHER PUBLICATIONS

Qian, Yasheng, Wei-Shou Hsu, and Peter Kabal. "Classified comfort noise generation for efficient voice transmission." Ninth International Conference on Spoken Language Processing. 2006. (Year: 2006).*

(Continued)

*Primary Examiner* — Brian L Albertalli
(74) *Attorney, Agent, or Firm* — Perkins Coie LLP; Michael A. Glenn

(57) ABSTRACT

An apparatus for encoding audio information is provided. The apparatus for encoding audio information includes a selector for selecting a comfort noise generation mode from two or more comfort noise generation modes depending on a background noise characteristic of an audio input signal, and an encoding unit for encoding the audio information, wherein the audio information includes mode information indicating the selected comfort noise generation mode.

17 Claims, 5 Drawing Sheets

Related U.S. Application Data continuation of application No. 15/417,228, filed on Jan. 27, 2017, now Pat. No. 10,089,993, which is a continuation of application No. PCT/EP2015/066323, filed on Jul. 16, 2015.

(51) Int. Cl.

| | |
|---|---|
| ***G10L 19/22*** | (2013.01) |
| ***G10L 21/0232*** | (2013.01) |

(56) References Cited

U.S. PATENT DOCUMENTS

| | | | | |
|---|---|---|---|---|
| 5,960,389 | A | 9/1999 | Jarvinen et al. | |
| 6,163,608 | A | 12/2000 | Romesburg et al. | |
| 6,424,941 | B1 | 7/2002 | Yu | |
| 6,424,942 | B1 | 7/2002 | Mustel et al. | |
| 6,606,593 | B1 * | 8/2003 | Jarvinen | G10L 19/012 704/226 |
| 6,662,155 | B2 * | 12/2003 | Rotola-Pukkila | G10L 19/012 704/226 |
| 6,782,361 | B1 * | 8/2004 | El-Maleh | G10L 19/012 704/226 |
| 7,610,197 | B2 | 10/2009 | Cruz-Zeno et al. | |
| 8,032,370 | B2 | 10/2011 | Jaervinen et al. | |
| 8,767,974 | B1 | 7/2014 | Lu et al. | |
| 2002/0103643 | A1 | 8/2002 | Rotola-Pukkila et al. | |
| 2003/0093270 | A1 | 5/2003 | Domer | |
| 2005/0267746 | A1 | 12/2005 | Jelinek et al. | |
| 2006/0293885 | A1 | 12/2006 | Gournay et al. | |
| 2008/0195383 | A1 | 8/2008 | Shlomot et al. | |
| 2008/0208575 | A1 | 8/2008 | Laaksonen et al. | |
| 2009/0110209 | A1 | 4/2009 | Li et al. | |
| 2012/0237048 | A1 | 9/2012 | Barron et al. | |
| 2013/0332174 | A1 | 12/2013 | Geiger et al. | |

FOREIGN PATENT DOCUMENTS

| | | | | |
|---|---|---|---|---|
| CN | 102136271 | A | 7/2011 | |
| CN | 103093756 | A | 5/2013 | |
| CN | 103548078 | A | 1/2014 | |
| EP | 0786760 | B1 | 5/2003 | |
| EP | 2661745 | A1 | 11/2013 | |
| JP | 2004078235 | A | 3/2004 | |
| JP | 2004525540 | A | 8/2004 | |
| JP | 2006502427 | A | 1/2006 | |
| JP | 2010518453 | A | 5/2010 | |
| JP | 2014505907 | A | 3/2014 | |
| RU | 2331933 | C2 | 8/2008 | |
| WO | 0233697 | A2 | 4/2002 | |
| WO | 2008148321 | A1 | 12/2008 | |
| WO | WO-2008148321 | A1 * | 12/2008 | G10L 19/012 |
| WO | 2009103608 | A1 | 8/2009 | |
| WO | 2012110447 | A1 | 8/2012 | |
| WO | 2012110481 | A1 | 8/2012 | |
| WO | 2014096279 | A1 | 6/2014 | |
| WO | 2014096280 | A1 | 6/2014 | |

OTHER PUBLICATIONS

3GPP TS 26.192 , "Digital cellular telecommunications system (Phase 2+); Universal Mobile Telecommunications System (UMTS); LTE; Speech codec speech processing functions; Adaptive Multi-Rate—Wideband (AMR-WB) speech codec; Comfort noise aspects", ETSI TS 126 192 v11.0.0 (Oct. 2012), Oct. 2012, 15 pages.

3GPP TS 26.445 , "[8 parts] Universal Mobile Telecommunications System (UMTS); LTE; EVS Codec Detailed Algorithmic Description", ETSI TS 126 445 V12.0.0. (Nov. 2014) 627 pp., Nov. 2014, pp. 1-117.

3GPP TS 26.449 , "Universal Mobile Telecommunications System (UMTS); LTE; EVS Codec Comfort Noise Generation (CNG) Aspects", ETSI TS 126 449 V12.0.0. (Oct. 2014), Oct. 2014, 10 pages.

* cited by examiner

APPARATUS AND METHOD FOR COMFORT NOISE GENERATION MODE SELECTION

CROSS-REFERENCE TO RELATED APPLICATIONS

This application is a continuation of U.S. patent application Ser. No. 16/141,115 filed Sep. 25, 2018, which in turn is is a continuation of U.S. patent application Ser. No. 15/417,228 filed Jan. 27, 2017, which is a continuation of International Application No. PCT/EP2015/066323, filed Jul. 16, 2015, which is incorporated herein by reference in its entirety, and additionally claims priority from European Application No. EP 14 178 782.0, filed Jul. 28, 2014 which is incorporated herein by reference in its entirety.

The present invention relates to audio signal encoding, processing and decoding, and, in particular, to an apparatus and method for comfort noise generation mode selection.

BACKGROUND OF THE INVENTION

Communication speech and audio codecs (e.g. AMR-WB, G.718) generally include a discontinuous transmission (DTX) scheme and a comfort noise generation (CNG) algorithm. The DTX/CNG operation is used to reduce the transmission rate by simulating background noise during inactive signal periods.

CNG may, for example, be implemented in several ways.

The most commonly used method, employed in codecs like AMR-WB (ITU-T G.722.2 Annex A) and G.718 (ITU-T G.718 Sec. 6.12 and 7.12), is based on an excitation+linear-prediction (LP) model. A random excitation signal is first generated, then scaled by a gain, and finally synthesized using a LP inverse filter, producing the time-domain CNG signal. The two main parameters transmitted are the excitation energy and the LP coefficients (generally using a LSF or ISF representation). This method is referred here as LP-CNG.

Another method, proposed recently and described in e.g. the patent application WO2014/096279, "Generation of a comfort noise with high spectro-temporal resolution in discontinuous transmission of audio signals", is based on a frequency-domain (FD) representation of the background noise. Random noise is generated in a frequency-domain (e.g. FFT, MDCT, QMF), then shaped using a FD representation of the background noise, and finally converted from the frequency to the time domain, producing the time-domain CNG signal. The two main parameters transmitted are a global gain and a set of band noise levels. This method is referred here as FD-CNG.

SUMMARY

According to an embodiment an apparatus for encoding audio information may have: a selector for selecting a comfort noise generation mode from two or more comfort noise generation modes depending on a background noise characteristic of an audio input signal, and an encoding unit for encoding the audio information, wherein the audio information includes mode information indicating the selected comfort noise generation mode.

According to another embodiment, an apparatus for generating an audio output signal based on received encoded audio information may have: a decoding unit for decoding encoded audio information to acquire mode information being encoded within the encoded audio information, wherein the mode information indicates an indicated comfort noise generation mode of two or more comfort noise generation modes, and a signal processor for generating the audio output signal by generating, depending on the indicated comfort noise generation mode, comfort noise.

According to another embodiment, a system may have: an apparatus as mentioned above for encoding audio information, and an apparatus as mentioned above for generating an audio output signal based on received encoded audio information, wherein the selector of the apparatus as mentioned above is configured to select a comfort noise generation mode from two or more comfort noise generation modes depending on a background noise characteristic of an audio input signal, wherein the encoding unit of the apparatus as mentioned above is configured to encode the audio information, including mode information indicating the selected comfort noise generation mode as an indicated comfort noise generation mode, to acquire encoded audio information, wherein the decoding unit of the apparatus as mentioned above is configured to receive the encoded audio information, and is furthermore configured to decode the encoded audio information to acquire the mode information being encoded within the encoded audio information, and wherein the signal processor of the apparatus as mentioned above is configured to generate the audio output signal by generating, depending on the indicated comfort noise generation mode, comfort noise.

According to another embodiment, a method for encoding audio information may have the steps of: selecting a comfort noise generation mode from two or more comfort noise generation modes depending on a background noise characteristic of an audio input signal, and encoding the audio information, wherein the audio information includes mode information indicating the selected comfort noise generation mode.

According to another embodiment, a method for generating an audio output signal based on received encoded audio information may have the steps of: decoding encoded audio information to acquire mode information being encoded within the encoded audio information, wherein the mode information indicates an indicated comfort noise generation mode of two or more comfort noise generation modes, and generating the audio output signal by generating, depending on the indicated comfort noise generation mode, comfort noise.

Another embodiment may have a non-transitory digital storage medium having a computer program stored thereon to perform the method for encoding audio information, the method having the steps of: selecting a comfort noise generation mode from two or more comfort noise generation modes depending on a background noise characteristic of an audio input signal, and encoding the audio information, wherein the audio information includes mode information indicating the selected comfort noise generation mode, when said computer program is run by a computer.

Another embodiment may have a non-transitory digital storage medium having a computer program stored thereon to perform the method for generating an audio output signal based on received encoded audio information, the method having the steps of: decoding encoded audio information to acquire mode information being encoded within the encoded audio information, wherein the mode information indicates an indicated comfort noise generation mode of two or more comfort noise generation modes, and generating the audio output signal by generating, depending on the indicated comfort noise generation mode, comfort noise, when said computer program is run by a computer.

An apparatus for encoding audio information is provided. The apparatus for encoding audio information comprises a selector for selecting a comfort noise generation mode from two or more comfort noise generation modes depending on a background noise characteristic of an audio input signal, and an encoding unit for encoding the audio information, wherein the audio information comprises mode information indicating the selected comfort noise generation mode.

Inter alia, embodiments are based on the finding that FD-CNG gives better quality on high-tilt background noise signals like e.g. car noise, while LP-CNG gives better quality on more spectrally flat background noise signals like e.g. office noise.

To get the best possible quality out of a DTX/CNG system, according to embodiments, both CNG approaches are used and one of them is selected depending on the background noise characteristics.

Embodiments provide a selector that decides which CNG mode should be used, for example, either LP-CNG or FD-CNG.

According to an embodiment, the selector may, e.g., be configured to determine a tilt of a background noise of the audio input signal as the background noise characteristic. The selector may, e.g., be configured to select said comfort noise generation mode from two or more comfort noise generation modes depending on the determined tilt.

In an embodiment, the apparatus may, e.g., further comprise a noise estimator for estimating a per-band estimate of the background noise for each of a plurality of frequency bands. The selector may, e.g., be configured to determine the tilt depending on the estimated background noise of the plurality of frequency bands.

According to an embodiment, the noise estimator may, e.g., be configured to estimate a per-band estimate of the background noise by estimating an energy of the background noise of each of the plurality of frequency bands.

In an embodiment, the noise estimator may, e.g., be configured to determine a low-frequency background noise value indicating a first background noise energy for a first group of the plurality of frequency bands depending on the per-band estimate of the background noise of each frequency band of the first group of the plurality of frequency bands.

Moreover, in such an embodiment, the noise estimator may, e.g., be configured to determine a high-frequency background noise value indicating a second background noise energy for a second group of the plurality of frequency bands depending on the per-band estimate of the background noise of each frequency band of the second group of the plurality of frequency bands. At least one frequency band of the first group may, e.g., have a lower centre-frequency than a centre-frequency of at least one frequency band of the second group. In a particular embodiment, each frequency band of the first group may, e.g., have a lower centre-frequency than a centre-frequency of each frequency band of the second group.

Furthermore, the selector may, e.g., be configured to determine the tilt depending on the low-frequency background noise value and depending on the high-frequency background noise value.

According to an embodiment, the noise estimator may, e.g., be configured to determine the low-frequency background noise value L according to $$L = \frac{1}{I_2 - I_1} \sum_{i=I_1}^{i<I_2} N[i]$$

wherein i indicates an i-th frequency band of the first group of frequency bands, wherein $I_1$ indicates a first one of the plurality of frequency bands, wherein $I_2$ indicates a second one of the plurality of frequency bands, and wherein N[i] indicates the energy estimate of the background noise energy of the i-th frequency band.

In an embodiment, the noise estimator may, e.g., be configured to determine the high-frequency background noise value H according to $$H = \frac{1}{I_4 - I_3} \sum_{i=I_3}^{i<I_4} N[i]$$

wherein i indicates an i-th frequency band of the second group of frequency bands, wherein $I_3$ indicates a third one of the plurality of frequency bands, wherein $I_4$ indicates a fourth one of the plurality of frequency bands, and wherein N[i] indicates the energy estimate of the background noise energy of the i-th frequency band.

According to an embodiment, the selector may, e.g., be configured to determine the tilt T depending on the low frequency background noise value L and depending on the high frequency background noise value H according to the formula $$T = \frac{L}{H},$$

or according to the formula $$T = \frac{H}{L},$$

or according to the formula $$T = L - H,$$

or according to the formula $$T = H - L.$$

In an embodiment, the selector may, e.g., be configured to determine the tilt as a current short-term tilt value. Moreover, the selector may, e.g., be configured to determine a current long-term tilt value depending on the current short-term tilt value and depending on a previous long-term tilt value. Furthermore, the selector may, e.g., be configured to select one of two or more comfort noise generation modes depending on the current long-term tilt value.

According to an embodiment, the selector may, e.g., be configured to determine the current long-term tilt value $T_{cLT}$ according to the formula:

$$T_{cLT} = \alpha T_{pLT} + (1-\alpha)T,$$

wherein T is the current short-term tilt value, wherein $T_{pLT}$ is said previous long-term tilt value, and wherein α is a real number with $0<\alpha<1$.

In an embodiment, a first one of the two or more comfort noise generation modes may, e.g., be a frequency-domain comfort noise generation mode. Moreover, a second one of the two or more comfort noise generation modes may, e.g., be a linear-prediction-domain comfort noise generation mode. Furthermore, the selector may, e.g., be configured to select the frequency-domain comfort noise generation mode, if a previously selected generation mode, being previously selected by the selector, is the linear-prediction-domain comfort noise generation mode and if the current long-term tilt value is greater than a first threshold value. Moreover, the selector may, e.g., be configured to select the linear-prediction-domain comfort noise generation mode, if the previously selected generation mode, being previously selected by the selector, is the frequency-domain comfort noise generation mode and if the current long-term tilt value is smaller than a second threshold value.

Moreover, an apparatus for generating an audio output signal based on received encoded audio information is provided. The apparatus comprises a decoding unit for decoding encoded audio information to obtain mode information being encoded within the encoded audio information, wherein the mode information indicates an indicated comfort noise generation mode of two or more comfort noise generation modes. Moreover, the apparatus comprises a signal processor for generating the audio output signal by generating, depending on the indicated comfort noise generation mode, comfort noise.

According to an embodiment, a first one of the two or more comfort noise generation modes may, e.g., be a frequency-domain comfort noise generation mode. The signal processor may, e.g., be configured, if the indicated comfort noise generation mode is the frequency-domain comfort noise generation mode, to generate the comfort noise in a frequency domain and by conducting a frequency-to-time conversion of the comfort noise being generated in the frequency domain. For example, in a particular embodiment, the signal processor may, e.g., be configured, if the indicated comfort noise generation mode is the frequency-domain comfort noise generation mode, to generate the comfort noise by generating random noise in a frequency domain, by shaping the random noise in the frequency domain to obtain shaped noise, and by converting the shaped noise from the frequency-domain to the time domain.

In an embodiment, a second one of the two or more comfort noise generation modes may, e.g., be a linear-prediction-domain comfort noise generation mode. The signal processor may, e.g., be configured, if the indicated comfort noise generation mode is the linear-prediction-domain comfort noise generation mode, to generate the comfort noise by employing a linear prediction filter. For example, in a particular embodiment, the signal processor may, e.g., be configured, if the indicated comfort noise generation mode is the linear-prediction-domain comfort noise generation mode, to generate the comfort noise by generating a random excitation signal, by scaling the random excitation signal to obtain a scaled excitation signal, and by synthesizing the scaled excitation signal using a LP inverse filter.

Furthermore, a system is provided. The system comprises an apparatus for encoding audio information according to one of the above-described embodiments and an apparatus for generating an audio output signal based on received encoded audio information according to one of the above-described embodiments. The selector of the apparatus for encoding audio information is configured to select a comfort noise generation mode from two or more comfort noise generation modes depending on a background noise characteristic of an audio input signal. The encoding unit of the apparatus for encoding audio information is configured to encode the audio information, comprising mode information indicating the selected comfort noise generation mode as an indicated comfort noise generation mode, to obtain encoded audio information. Moreover, the decoding unit of the apparatus for generating an audio output signal is configured to receive the encoded audio information, and is furthermore configured to decode the encoded audio information to obtain the mode information being encoded within the encoded audio information. The signal processor of the apparatus for generating an audio output signal is configured to generate the audio output signal by generating, depending on the indicated comfort noise generation mode, comfort noise.

Moreover, a method for encoding audio information is provided. The method comprises:

Selecting a comfort noise generation mode from two or more comfort noise generation modes depending on a background noise characteristic of an audio input signal. And:

Encoding the audio information, wherein the audio information comprises mode information indicating the selected comfort noise generation mode.

Furthermore, a method for generating an audio output signal based on received encoded audio information is provided. The method comprises:

Decoding encoded audio information to obtain mode information being encoded within the encoded audio information, wherein the mode information indicates an indicated comfort noise generation mode of two or more comfort noise generation modes. And:

Generating the audio output signal by generating, depending on the indicated comfort noise generation mode, comfort noise.

Moreover, a computer program for implementing the above-described method when being executed on a computer or signal processor is provided.

So, in some embodiments, the proposed selector may, e.g., be mainly based on the tilt of the background noise. For example, if the tilt of the background noise is high then FD-CNG is selected, otherwise LP-CNG is selected.

A smoothed version of the background noise tilt and a hysteresis may, e.g., be used to avoid switching often from one mode to another.

The tilt of the background noise may, for example, be estimated using the ratio of the background noise energy in the low frequencies and the background noise energy in the high frequencies.

The background noise energy may, for example, be estimated in the frequency domain using a noise estimator.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
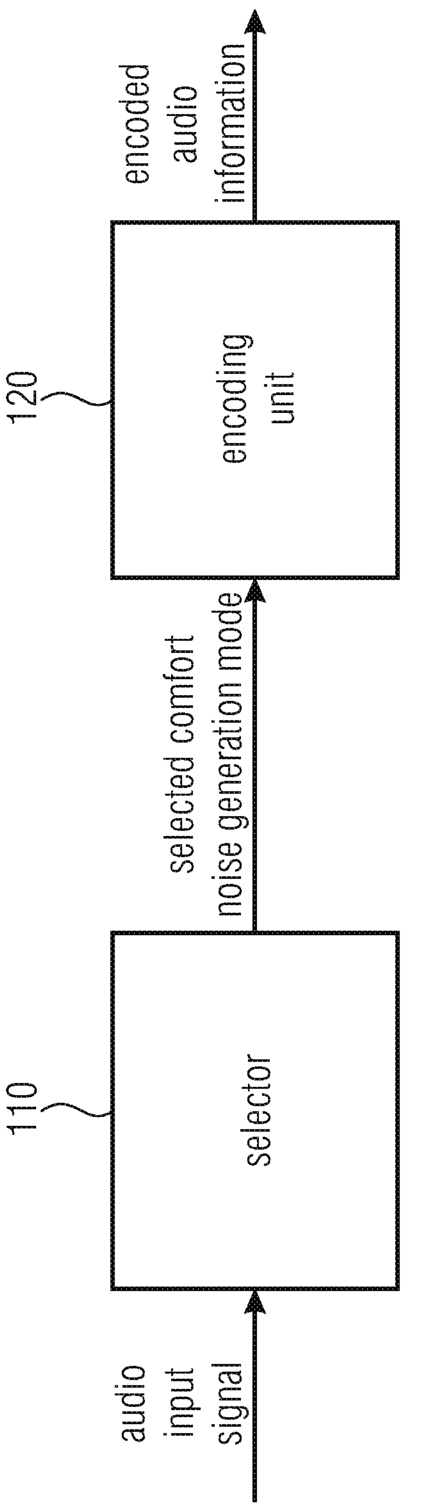
FIG. 1 illustrates an apparatus for encoding audio information according to an embodiment.

FIG. 1 illustrates an apparatus for encoding audio information according to an embodiment.

The apparatus for encoding audio information comprises a selector 110 for selecting a comfort noise generation mode from two or more comfort noise generation modes depending on a background noise characteristic of an audio input signal.

Moreover, the apparatus comprises an encoding unit 120 for encoding the audio information, wherein the audio information comprises mode information indicating the selected comfort noise generation mode.

For example, a first one of the two or more comfort noise generation modes may, e.g., be a frequency-domain comfort noise generation mode. And/or, for example, a second one of the two or more generation modes may, e.g., be a linear-prediction-domain comfort noise generation mode.

For example, if, on a decoder side, the encoded audio information is received, wherein the mode information, being encoded within the encoded audio information, indicates that the selected comfort noise generation mode is the frequency-domain comfort noise generation mode, then, a signal processor on the decoder side may, for example, generate the comfort noise by generating random noise in a frequency domain, by shaping the random noise in the frequency domain to obtain shaped noise, and by converting the shaped noise from the frequency-domain to the time domain.

However, if for example, the mode information, being encoded within the encoded audio information, indicates that the selected comfort noise generation mode is the linear-prediction-domain comfort noise generation mode, then, the signal processor on the decoder side may, for example, generate the comfort noise by generating a random excitation signal, by scaling the random excitation signal to obtain a scaled excitation signal, and by synthesizing the scaled excitation signal using a LP inverse filter.

Within the encoded audio information, not only the information on the comfort noise generation mode, but also additional information may be encoded. For example, frequency-band specific gain factors may also be encoded, for example, one gain factor for each frequency band. Or, for example, one or more LP filter coefficients, or LSF coefficients or ISF coefficients may, e.g., be encoded within the encoded audio information. The information on the selected comfort noise generation mode and the additional information, being encoded within the encoded audio information may then, e.g., be transmitted to a decoder side, for example, within an SID frame (SID=Silence Insertion Descriptor).

The information on the selected comfort noise generation mode may be encoded explicitly or implicitly.

When explicitly encoding the selected comfort noise generation mode, then, one or more bits may, for example, be employed to indicate which one of the two or more comfort noise generation modes the selected comfort noise generation mode is. In such an embodiment, said one or more bits are then the encoded mode information.

In other embodiments, however, the selected comfort noise generation mode is implicitly encoded within the audio information. For example, in the above-mentioned example, the frequency-band specific gain factors and the one or more LP (or LSF or ISF) coefficients may, e.g., have a different data format or may, e.g., have a different bit length. If, for example, frequency-band specific gain factors are encoded within the audio information, this may, e.g., indicate that the frequency-domain comfort noise generation mode is the selected comfort noise generation mode. If, however, the one or more LP (or LSF or ISF) coefficients are encoded within the audio information, this may, e.g., indicate that the linear-prediction-domain comfort noise generation mode is the selected comfort noise generation mode. When such an implicit encoding is used, the frequency-band specific gain factors or the one or more LP (or LSF or ISF) coefficients then represent the mode information being encoded within the encoded audio signal, wherein this mode information indicates the selected comfort noise generation mode.

According to an embodiment, the selector 110 may, e.g., be configured to determine a tilt of a background noise of the audio input signal as the background noise characteristic. The selector 110 may, e.g., be configured to select said comfort noise generation mode from two or more comfort noise generation modes depending on the determined tilt.

For example, a low-frequency background noise value and a high-frequency background noise value may be employed, and the tilt of the background noise may, e.g., be calculated depending on the low-frequency background noise value and depending on the high-frequency background-noise value.

Figure 2:
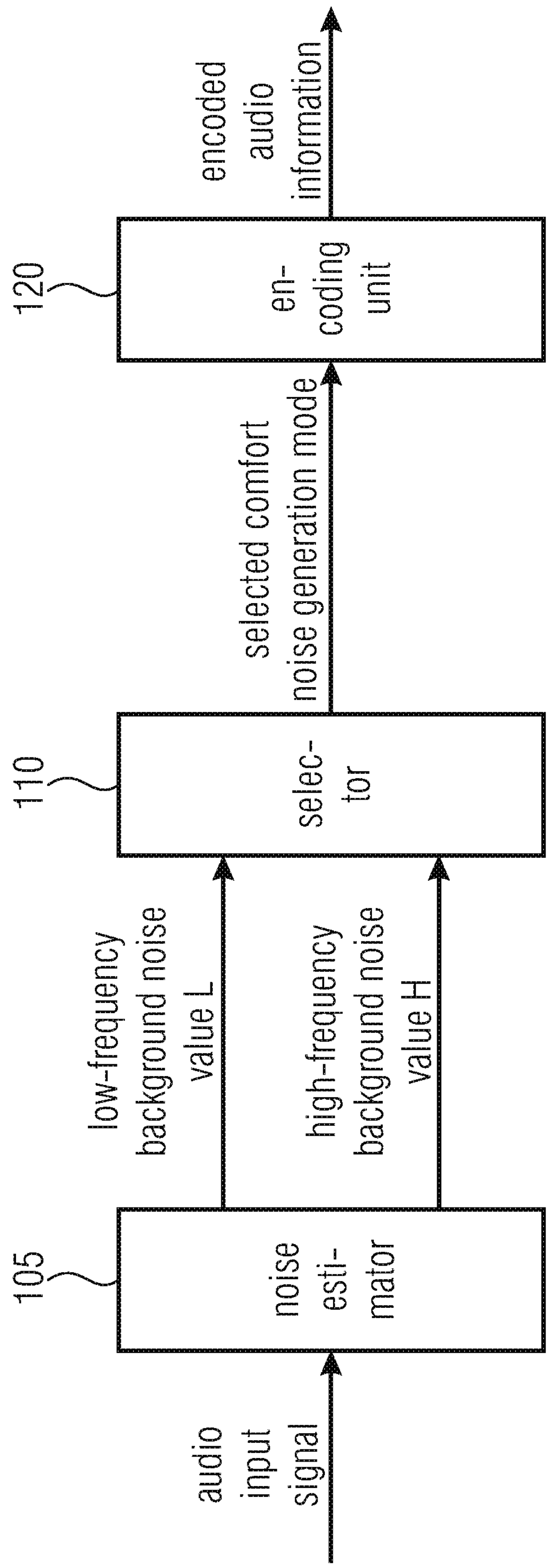
FIG. 2 illustrates an apparatus for encoding audio information according to another embodiment.

FIG. 2 illustrates an apparatus for encoding audio information according to a further embodiment. The apparatus of FIG. 2 further comprises a noise estimator 105 for estimating a per-band estimate of the background noise for each of a plurality of frequency bands. The selector 110 may, e.g., be configured to determine the tilt depending on the estimated background noise of the plurality of frequency bands.

According to an embodiment, the noise estimator 105 may, e.g., be configured to estimate a per-band estimate of the background noise by estimating an energy of the background noise of each of the plurality of frequency bands.

In an embodiment, the noise estimator 105 may, e.g., be configured to determine a low-frequency background noise value indicating a first background noise energy for a first group of the plurality of frequency bands depending on the per-band estimate of the background noise of each frequency band of the first group of the plurality of frequency bands.

Moreover, the noise estimator 105 may, e.g., be configured to determine a high-frequency background noise value indicating a second background noise energy for a second group of the plurality of frequency bands depending on the per-band estimate of the background noise of each frequency band of the second group of the plurality of frequency bands. At least one frequency band of the first group may, e.g., have a lower centre-frequency than a centre-frequency of at least one frequency band of the second group. In a particular embodiment, each frequency band of the first group may, e.g., have a lower centre-frequency than a centre-frequency of each frequency band of the second group.

Furthermore, the selector 110 may, e.g., be configured to determine the tilt depending on the low-frequency background noise value and depending on the high-frequency background noise value.

According to an embodiment, the noise estimator 105 may, e.g., be configured to determine the low-frequency background noise value L according to $$L = \frac{1}{I_2 - I_1} \sum_{i=I_1}^{i<I_2} N[i]$$

wherein i indicates an i-th frequency band of the first group of frequency bands, wherein $I_1$ indicates a first one of the plurality of frequency bands, wherein $I_2$ indicates a second one of the plurality of frequency bands, and wherein N[i] indicates the energy estimate of the background noise energy of the i-th frequency band.

Similarly, in an embodiment, the noise estimator 105 may, e.g., be configured to determine the high-frequency background noise value H according to $$H = \frac{1}{I_4 - I_3} \sum_{i=I_3}^{i<I_4} N[i]$$

wherein i indicates an i-th frequency band of the second group of frequency bands, wherein $I_3$ indicates a third one of the plurality of frequency bands, wherein $I_4$ indicates a fourth one of the plurality of frequency bands, and wherein N[i] indicates the energy estimate of the background noise energy of the i-th frequency band.

According to an embodiment, the selector 110 may, e.g., be configured to determine the tilt T depending on the low frequency background noise value L and depending on the high frequency background noise value H according to the formula:

$$T = \frac{L}{H},$$

or according to the formula $$T = \frac{H}{L},$$

or according to the formula $$T=L-H,$$

or according to the formula $$T=H-L.$$

For example, when L and H are represented in a logarithmic domain, one of the subtraction formulae (T=L−H or T=H−L) may be employed.

In an embodiment, the selector 110 may, e.g., be configured to determine the tilt as a current short-term tilt value. Moreover, the selector 110 may, e.g., be configured to determine a current long-term tilt value depending on the current short-term tilt value and depending on a previous long-term tilt value. Furthermore, the selector 110 may, e.g., be configured to select one of two or more comfort noise generation modes depending on the current long-term tilt value.

According to an embodiment, the selector 110 may, e.g., be configured to determine the current long-term tilt value $T_{cLT}$ according to the formula:

$$T_{cLT}=\alpha T_{pLT}(1-\alpha)T,$$

wherein T is the current short-term tilt value, wherein $T_{pLT}$ is said previous long-term tilt value, and wherein α is a real number with $0<\alpha<1$.

In an embodiment, a first one of the two or more comfort noise generation modes may, e.g., be a frequency-domain comfort noise generation mode FD_CNG. Moreover, a second one of the two or more comfort noise generation modes may, e.g., be a linear-prediction-domain comfort noise generation mode LP_CNG. The selector 110 may, e.g., be configured to select the frequency-domain comfort noise generation mode FD_CNG, if a previously selected generation mode cng_mode_prev, being previously selected by the selector 110, is the linear-prediction-domain comfort noise generation mode LP_CNG and if the current long-term tilt value is greater than a first threshold value $thr_1$. Moreover, the selector 110 may, e.g., be configured to select the linear-prediction-domain comfort noise generation mode LP_CNG, if the previously selected generation mode cng_mode_prev, being previously selected by the selector 110, is the frequency-domain comfort noise generation mode FD_CNG and if the current long-term tilt value is smaller than a second threshold value $thr_2$.

In some embodiments, the first threshold value is equal to the second threshold value. In some other embodiments, however, the first threshold value is different from the second threshold value.

Figure 4:
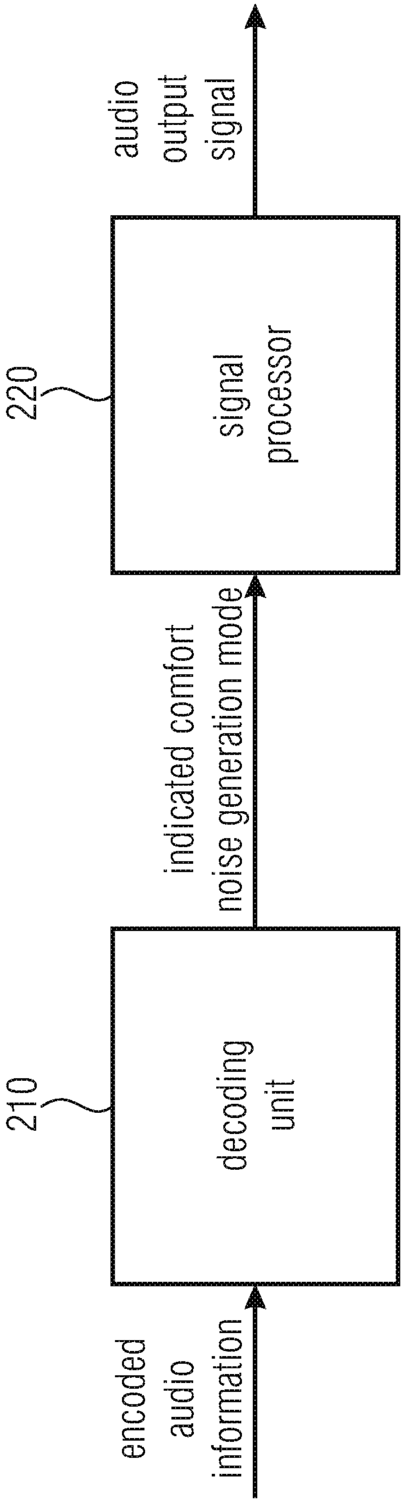
FIG. 4 illustrates an apparatus for generating an audio output signal based on received encoded audio information according to an embodiment.

FIG. 4 illustrates an apparatus for generating an audio output signal based on received encoded audio information according to an embodiment.

The apparatus comprises a decoding unit 210 for decoding encoded audio information to obtain mode information being encoded within the encoded audio information. The mode information indicates an indicated comfort noise generation mode of two or more comfort noise generation modes.

Moreover, the apparatus comprises a signal processor 220 for generating the audio output signal by generating, depending on the indicated comfort noise generation mode, comfort noise.

According to an embodiment, a first one of the two or more comfort noise generation modes may, e.g., be a frequency-domain comfort noise generation mode. The signal processor 220 may, e.g., be configured, if the indicated comfort noise generation mode is the frequency-domain comfort noise generation mode, to generate the comfort noise in a frequency domain and by conducting a frequency-to-time conversion of the comfort noise being generated in the frequency domain. For example, in a particular embodiment, the signal processor may, e.g., be configured, if the indicated comfort noise generation mode is the frequency-domain comfort noise generation mode, to generate the comfort noise by generating random noise in a frequency domain, by shaping the random noise in the frequency domain to obtain shaped noise, and by converting the shaped noise from the frequency-domain to the time domain.

For example, the concepts described in WO 2014/096279 A1 may be employed.

For example, a random generator may be applied to excite each individual spectral band in the FFT domain and/or in the QMF domain by generating one or more random sequences (FFT=Fast Fourier Transform; QMF=Quadrature Mirror Filter). Shaping of the random noise may, e.g., be conducted by individually computing the amplitude of the random sequences in each band such that the spectrum of the generated comfort noise resembles the spectrum of the actual background noise present, for example, in a bitstream, comprising, e.g., an audio input signal. Then, for example, the computed amplitude may, e.g., be applied on the random sequence, e.g., by multiplying the random sequence with the computed amplitude in each frequency band. Then, converting the shaped noise from the frequency domain to the time domain may be employed.

In an embodiment, a second one of the two or more comfort noise generation modes may, e.g., be a linear-prediction-domain comfort noise generation mode. The signal processor 220 may, e.g., be configured, if the indicated comfort noise generation mode is the linear-prediction-domain comfort noise generation mode, to generate the comfort noise by employing a linear prediction filter. For example, in a particular embodiment, the signal processor may, e.g., be configured, if the indicated comfort noise generation mode is the linear-prediction-domain comfort noise generation mode, to generate the comfort noise by generating a random excitation signal, by scaling the random excitation signal to obtain a scaled excitation signal, and by synthesizing the scaled excitation signal using a LP inverse filter.

For example, comfort noise generation as described in G.722.2 (see ITU-T G.722.2 Annex A) and/or as described in G.718 (see ITU-T G.718 Sec. 6.12 and 7.12) may be employed. Such comfort noise generation in a random excitation domain by scaling a random excitation signal to obtain a scaled excitation signal, and by synthesizing the scaled excitation signal using a LP inverse filter is well known to a person skilled in the art.

Figure 5:
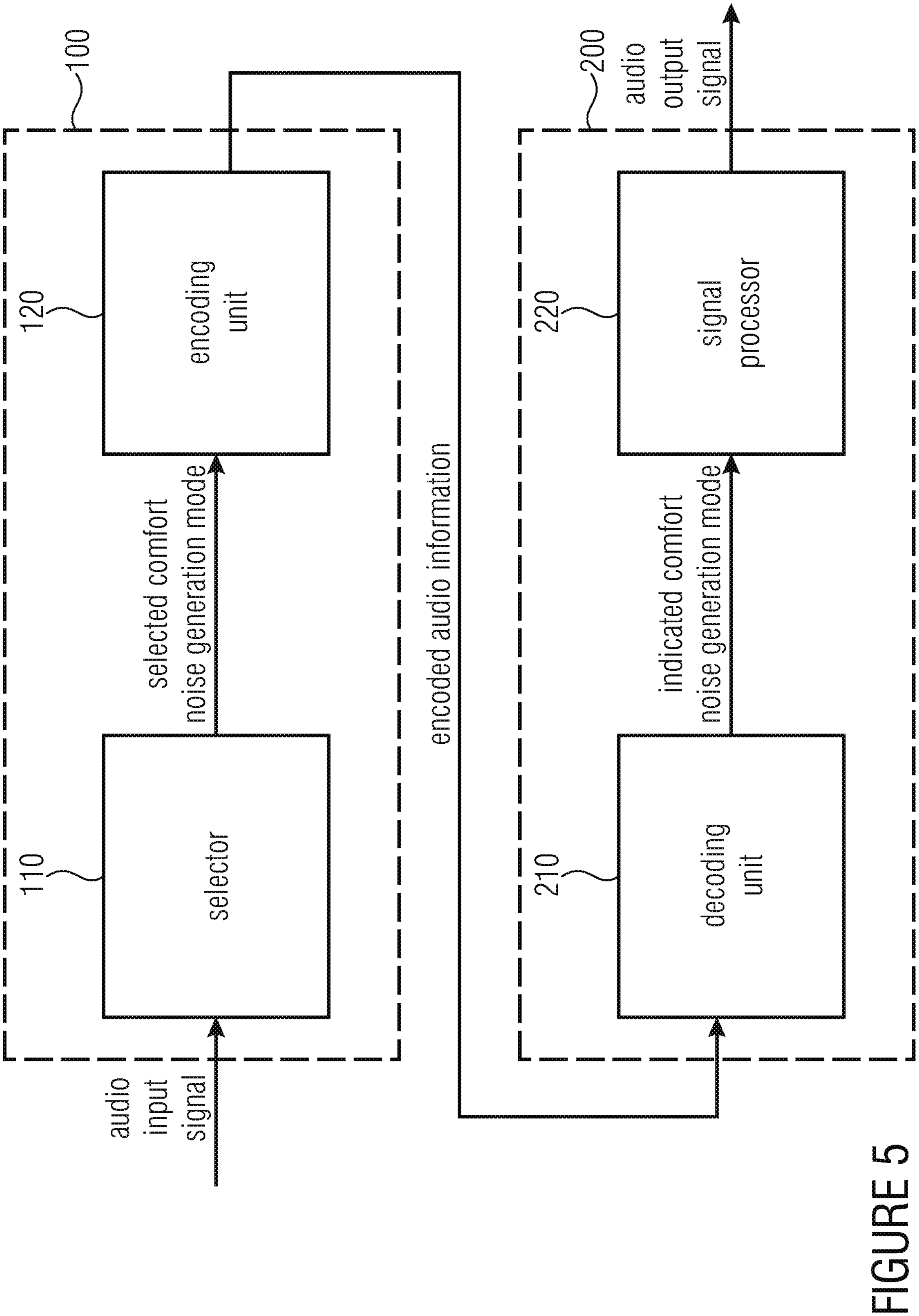
FIG. 5 illustrates a system according to an embodiment.

FIG. 5 illustrates a system according to an embodiment. The system comprises an apparatus 100 for encoding audio information according to one of the above-described embodiments and an apparatus 200 for generating an audio output signal based on received encoded audio information according to one of the above-described embodiments.

The selector 110 of the apparatus 100 for encoding audio information is configured to select a comfort noise generation mode from two or more comfort noise generation modes depending on a background noise characteristic of an audio input signal. The encoding unit 120 of the apparatus 100 for encoding audio information is configured to encode the audio information, comprising mode information indicating the selected comfort noise generation mode as an indicated comfort noise generation mode, to obtain encoded audio information.

Moreover, the decoding unit 210 of the apparatus 200 for generating an audio output signal is configured to receive the encoded audio information, and is furthermore configured to decode the encoded audio information to obtain the mode information being encoded within the encoded audio information. The signal processor 220 of the apparatus 200 for generating an audio output signal is configured to generate the audio output signal by generating, depending on the indicated comfort noise generation mode, comfort noise.

Figure 3:
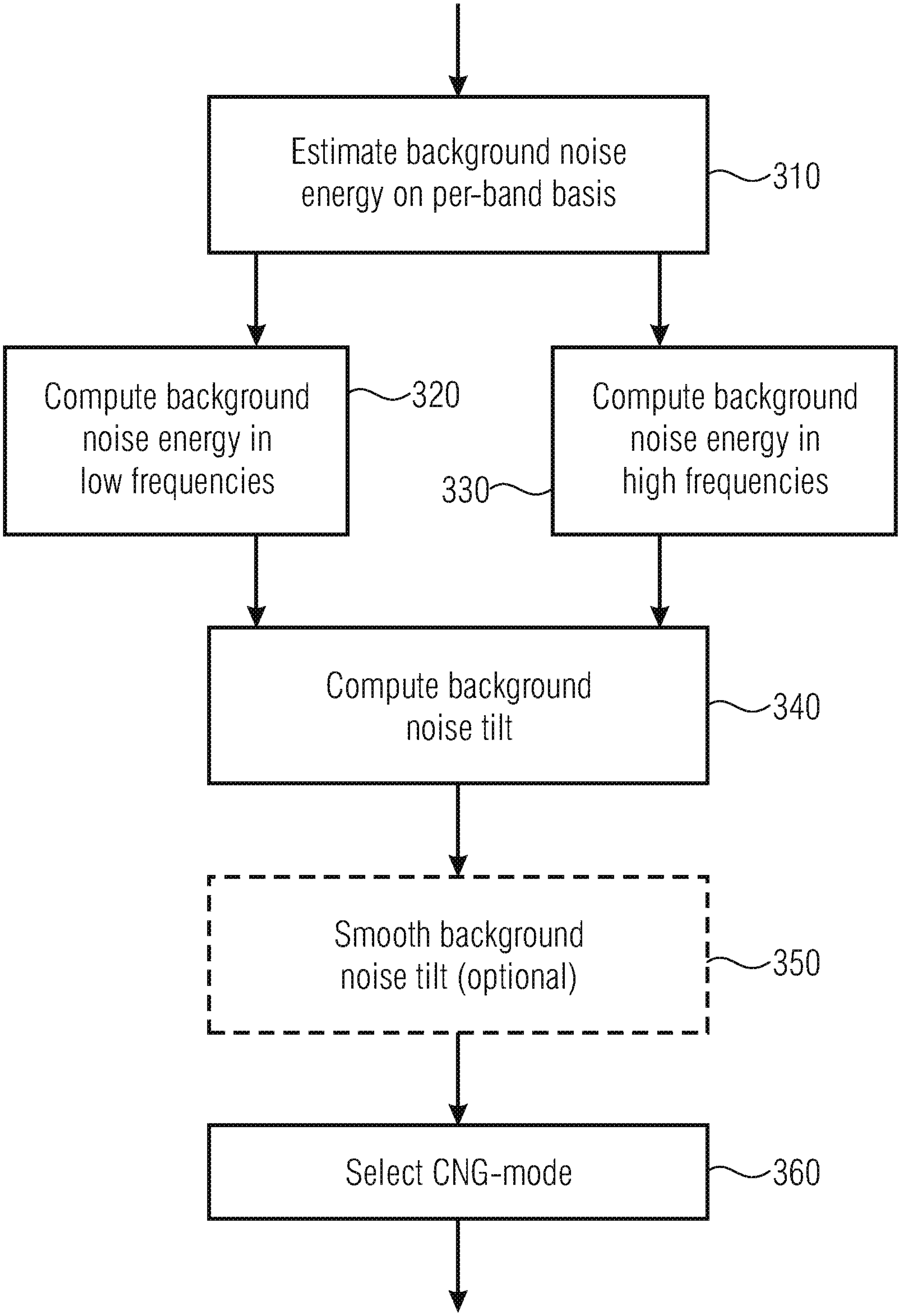
FIG. 3 illustrates a step-by-step approach for selecting a comfort noise generation mode according to an embodiment.

FIG. 3 illustrates a step-by-step approach for selecting a comfort noise generation mode according to an embodiment.

In step 310, a noise estimator is used to estimate the background noise energy in the frequency domain. This is generally performed on a per-band basis, producing one energy estimate per band $N[i]$ with $0 \le i < N$ and $N$ the number of bands (e.g. $N=20$)

Any noise estimator producing a per-band estimate of the background noise energy can be used. One example is the noise estimator used in G.718 (ITU-T G.718 Sec. 6.7).

In step 320, the background noise energy in the low frequencies is computed using $$L = \frac{1}{I_2 - I_1} \sum_{i=I_1}^{i<I_2} N[i]$$

with $I_1$ and $I_2$ can depend on the signal bandwidth, e.g. $I_1=1$, $I_2=9$ for NB and $I_1=0$, $I_2=10$ for WB.

L may be considered as a low-frequency background noise value as described above.

In step 330, the background noise energy in the high frequencies is computed using $$H = \frac{1}{I_4 - I_3} \sum_{i=I_3}^{i<I_4} N[i]$$

with $I_3$ and $I_4$ can depend on the signal bandwidth, e.g. $I_3=16$, $I_4=17$ for NB and $I_3=19$, $I_4=20$ for WB.

H may be considered as a high-frequency background noise value as described above.

Steps 320 and 330 may, e.g., be conducted subsequently or independently from each other.

In step 340, the background noise tilt is computed using $$T = \frac{L}{H}$$

Some embodiments may, e.g., proceed according to step 350. In step 350, the background noise tilt is smoothed, producing a long-term version of the background noise tilt $$T_{LT} = \alpha T_{LT} + (1-\alpha) T$$

with $\alpha$ is e.g. 0.9. In this recursive equation, the $T_{LT}$ on the left side of the equals sign is the current long-term tilt value $T_{cLT}$ mentioned above, and the $T_{LT}$ on the right side of the equals sign is said previous long-term tilt value $T_{pLT}$ mentioned above.

In step 360, the CNG mode is finally selected using the following classifier with hysteresis If (cng_mode_prev==LP_CNG and $T_{LT}$>$thr_1$) then cng_mode=FD_CNG If (cng_mode_prev==FD_CNG and $T_{LT}$<$thr_2$) then cng_mode=LP_CNG wherein $thr_1$ and $thr_2$ can depend on the bandwidth, e.g. $thr_1=9$, $thr_2=2$ for NB and $thr_1=45$, $thr_2=10$ for WB.

cng_mode is the comfort noise generation mode that is (currently) selected by the selector 110.

cng_mode_prev is a previously selected (comfort noise) generation mode that has previously been selected by the selector 110.

What happens when none of the above-conditions of step 360 are fulfilled, depends on the implementation. In an embodiment, for example, if none of both conditions of step 360 are fulfilled, the CNG mode may remain the same as it was, so that cng_mode=cng_mode_prev.

Other embodiments may implement other selection strategies.

While in the embodiment of FIG. 3, $thr_1$ is different from $thr_2$, in some other embodiments, however, $thr_1$ is equal to $thr_2$.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for encoding audio information, comprising:

a selector for selecting a comfort noise generation mode from two or more comfort noise generation modes depending on a background noise characteristic of an audio input signal, wherein a first one of the two or more comfort noise generation modes is a frequency-domain comfort noise generation mode, and an encoding unit for encoding the audio information, wherein the audio information comprises mode information indicating the selected comfort noise generation mode.

2. The apparatus according to claim 1, wherein the selector is configured to determine a tilt of a background noise of the audio input signal as the background noise characteristic, and wherein the selector is configured to select said comfort noise generation mode from two or more comfort noise generation modes depending on the determined tilt.

3. The apparatus according to claim 2, wherein the apparatus further comprises a noise estimator for estimating a per-band estimate of the background noise for each of a plurality of frequency bands, and wherein the selector is configured to determine the tilt depending on the estimated background noise of the plurality of frequency bands.

4. The apparatus according to claim 3, wherein the noise estimator is configured to determine a low-frequency background noise value indicating a first background noise energy for a first group of the plurality of frequency bands depending on the per-band estimate of the background noise of each frequency band of the first group of the plurality of frequency bands, wherein the noise estimator is configured to determine a high-frequency background noise value indicating a second background noise energy for a second group of the plurality of frequency bands depending on the per-band estimate of the background noise of each frequency band of the second group of the plurality of frequency bands, wherein at least one frequency band of the first group comprises a lower centre-frequency than a centre-frequency of at least one frequency band of the second group, and wherein the selector is configured to determine the tilt depending on the low-frequency background noise value and depending on the high-frequency background noise value.

5. The apparatus according to claim 4, wherein the noise estimator is configured to determine the low-frequency background noise value L according to $$L = \frac{1}{I_2 - I_1} \sum_{i=I_1}^{i<I_2} N[i]$$

wherein i indicates an i-th frequency band of the first group of frequency bands, wherein $I_1$ indicates a first one of the plurality of frequency bands, wherein $I_2$ indicates a second one of the plurality of frequency bands, and wherein N[i] indicates the energy estimate of the background noise energy of the i-th frequency band, wherein the noise estimator is configured to determine the high-frequency background noise value H according to $$H = \frac{1}{I_4 - I_3} \sum_{i=I_3}^{i<I_4} N[i]$$

wherein i indicates an i-th frequency band of the second group of frequency bands, wherein $I_3$ indicates a third one of the plurality of frequency bands, wherein $I_4$ indicates a fourth one of the plurality of frequency bands, and wherein N[i] indicates the energy estimate of the background noise energy of the i-th frequency band.

6. The apparatus according to claim 4, wherein the selector is configured to determine the tilt T depending on the low frequency background noise value L and depending on the high frequency background noise value H according to the formula $$T = \frac{L}{H},$$

or according to the formula $$T = \frac{H}{L},$$

or according to the formula $$T = L - H,$$

or according to the formula $$T = H - L.$$

7. The apparatus according to claim 2, wherein the selector is configured to determine the tilt as a current short-term tilt value, wherein the selector is configured to determine a current long-term tilt value depending on the current short-term tilt value and depending on a previous long-term tilt value, wherein the selector is configured to select one of two or more comfort noise generation modes depending on the current long-term tilt value.

8. The apparatus according to claim 7, wherein the selector is configured to determine the current long-term tilt value $T_{cLT}$ according to the formula:

$$T_{cLT} = \alpha T_{pLT} + (1-\alpha) T,$$

wherein T is the current short-term tilt value, wherein $T_{pLT}$ is said previous long-term tilt value, and wherein $\alpha$ is a real number with $0<\alpha<1$.

9. The apparatus according to claim 7, wherein a second one of the two or more comfort noise generation modes is a linear-prediction-domain comfort noise generation mode, wherein the selector is configured to select the frequency-domain comfort noise generation mode, if a previously selected generation mode, being previously selected by the selector, is the linear-prediction-domain comfort noise generation mode and if the current long-term tilt value is greater than a first threshold value, and wherein the selector is configured to select the linear-prediction-domain comfort noise generation mode, if the previously selected generation mode, being previously selected by the selector, is the frequency-domain comfort noise generation mode and if the current long-term tilt value is smaller than a second threshold value.

10. An apparatus for generating an audio output signal based on received encoded audio information, comprising:

a decoding unit for decoding encoded audio information to acquire mode information being encoded within the encoded audio information, wherein the mode information indicates an indicated comfort noise generation mode of two or more comfort noise generation modes, wherein a first one of the two or more comfort noise generation modes is a frequency-domain comfort noise generation mode, and a signal processor for generating the audio output signal by generating, depending on the indicated comfort noise generation mode, comfort noise.

11. The apparatus according to claim 10, wherein the signal processor is configured, if the indicated comfort noise generation mode is the frequency-domain comfort noise generation mode, to generate the comfort noise in a frequency domain and by conducting a frequency-to-time conversion of the comfort noise being generated in the frequency domain.

12. The apparatus according to claim 10, wherein a second one of the two or more comfort noise generation modes is a linear-prediction-domain comfort noise generation mode, and wherein the signal processor is configured, if the indicated comfort noise generation mode is the linear-prediction-domain comfort noise generation mode, to generate the comfort noise by employing a linear prediction filter.

13. A system comprising:

an apparatus according to claim 1 for encoding audio information, and an apparatus according to claim 10 for generating an audio output signal based on received encoded audio information, wherein the selector of the apparatus according to claim 1 is configured to select a comfort noise generation mode from two or more comfort noise generation modes depending on a background noise characteristic of an audio input signal, wherein the encoding unit of the apparatus according to claim 1 is configured to encode the audio information, comprising mode information indicating the selected comfort noise generation mode as an indicated comfort noise generation mode, to acquire encoded audio information, wherein the decoding unit of the apparatus according to claim 10 is configured to receive the encoded audio information, and is furthermore configured to decode the encoded audio information to acquire the mode information being encoded within the encoded audio information, and wherein the signal processor of the apparatus according to claim 10 is configured to generate the audio output signal by generating, depending on the indicated comfort noise generation mode, comfort noise.

14. A method for encoding audio information, comprising:

selecting a comfort noise generation mode from two or more comfort noise generation modes depending on a background noise characteristic of an audio input signal, wherein a first one of the two or more comfort noise generation modes is a frequency-domain comfort noise generation mode, and encoding the audio information, wherein the audio information comprises mode information indicating the selected comfort noise generation mode.

15. A method for generating an audio output signal based on received encoded audio information, comprising:

decoding encoded audio information to acquire mode information being encoded within the encoded audio information, wherein the mode information indicates an indicated comfort noise generation mode of two or more comfort noise generation modes, wherein a first one of the two or more comfort noise generation modes is a frequency-domain comfort noise generation mode, and generating the audio output signal by generating, depending on the indicated comfort noise generation mode, comfort noise.

16. A non-transitory digital storage medium having a computer program stored thereon to perform the method for encoding audio information, the method comprising:

selecting a comfort noise generation mode from two or more comfort noise generation modes depending on a background noise characteristic of an audio input signal, wherein a first one of the two or more comfort noise generation modes is a frequency-domain comfort noise generation mode, and encoding the audio information, wherein the audio information comprises mode information indicating the selected comfort noise generation mode, when said computer program is run by a computer.

17. A non-transitory digital storage medium having a computer program stored thereon to perform the method for generating an audio output signal based on received encoded audio information, the method comprising:

decoding encoded audio information to acquire mode information being encoded within the encoded audio information, wherein the mode information indicates an indicated comfort noise generation mode of two or more comfort noise generation modes, wherein a first one of the two or more comfort noise generation modes is a frequency-domain comfort noise generation mode, and generating the audio output signal by generating, depending on the indicated comfort noise generation mode, comfort noise, when said computer program is run by a computer.

* * * * *